Patented July 21, 1953

2,646,371

UNITED STATES PATENT OFFICE 2,646,371

ADHESIVE SHEETS

James A. McGarry, New Brunswick, N. J., assignor to Permacel Tape Corporation, a corporation of New Jersey No Drawing. Application April 29, 1949, Serial No. 90,544

5 Claims. (Cl. 117—122)

1

This invention relates to adhesives and more particularly to normally tacky and pressure-sensitive adhesive sheets or tapes.

Most commercially useful adhesive sheets depend for utility upon a combination of backing and adhesive wherein the adhesive has greater affinity for the side of the backing to which it was applied than for the opposite side of the backing. If such a relation exists, several layers of adhesive sheets may be stacked or rolled one upon the other and stored in this condition for prolonged periods of time. The layers may be separated without damage to each individual adhesive sheet, whenever this is desired, and used in the conventional manner, for instance to mask articles in painting or sandblasting operations, to bind articles for instance in packaging operations, to hinge sheets for instance is book binding, to mend or repair for instance in the case of clothing and for many other uses.

Two methods were used in the prior art to provide commercially the desired combination wherein the adhesive should have greater affinity toward the side of the backing to which it had been applied than toward the opposite side:

1. The backing was precoated on one side with a material, often called a primer or subbing coat, to increase its affinity for the pressure-sensitive adhesive and the pressure-sensitive adhesive was applied over this precoating. This method was preferred in the case of nonfibrous backings such as regenerated cellulose, cellulose acetate, rubber hydrochloride, vinyl chloride, or vinyl ester films, wherein the smoothness of the uncoated surface was thought to make adhesion of the adhesive mass to the uncoated surface difficult.

2. The backing was precoated with a material, sometimes called a repellent or backsize, that had very little affinity for the adhesive and the adhesive was applied to the surface opposite the precoating. This method was preferred in the case of fibrous backing such as nonwoven matted fabric, e. g. paper, and cotton, linen or synthetic cloth. It was believed that in all of these cases the mechanical anchorage between fibrous backing and adhesive would aid in preventing transfer of the adhesive from the side to which it had been applied to the opposite side.

Unfortunately, neither of the two methods proved completely satisfactory, particularly in connection with the thin, fragile film backings that form the basis of a large percentage of the adhesive sheets in use. In the normal life of a stack of adhesive sheets and particularly of a tape roll, considerable expansion and contraction of the thin webs takes place prior to the ultimate use of the sheets. These physical forces are due in many cases to changes in temperature and humidity during transportation and storage and in some cases to strain imposed upon the adhesive sheets during manufacture and stacking. They exert such a frictioning and welding effect

2 upon each layer in the stack that prior to its ultimate use the adhesive is frequently united so strongly to both adjacent backing surfaces, whether pretreated or not, that separation of adjacent adhesive sheet layers for use is made extremely difficult. In the worst cases some adhesive mass transfers during stacking from the side of the sheet to which it had been applied to the opposite side, providing an irregular and unsightly adhesive sheet product. In many other cases considerable force is required to separate adjacent layers of the product prior to use, and frequently the force that has to be used to separate the layers is so great that breaks and splits in the backing occur prior to separation, making satisfactory use of the product impossible. Moreover, in the case of adhesive sheets made in accordance with the second of the methods outlined above, the location and nature of the "repellent" coating acted frequently to defeat the purpose of making a readily useful product. Usually the materials which can be considered to have the best repellent properties have not much more affinity for the backing surface to which they are applied than they have for the adhesive mass. Under these circumstances and under the strains that a thin repellent coating undergoes during manufacture, storage and unrolling, it is quite common for the repellent coating to transfer from the back surfaces to which it has been applied to the adjacent surfaces of the adhesive. The result is a product wherein the adhesive is coated with a substantial, often irregular, film of non-tacky repellent. In this case the adhesive becomes inactive and inoperative, and the adhesive sheet useless.

The above described difficulties are responsible for many of the complaints involving adhesive sheets.

This invention is based upon the surprising discovery that adhesive sheets relatively free of the difficulties mentioned above and satisfactory under a wide variety of conditions result from preparation of the adhesive sheet in any conventional manner after addition to the normally tacky and pressure-sensitive adhesive mass of one or more specific deactivators that decrease the affinity of the mass to the opposite surface of the adhesive sheet without decreasing its affinity for most other surfaces to which it may be attached in use. Suitable specific deactivators fall within a class of products having several well defined physical properties. Such specific deactivators are: 1. surface active; 2. water-insoluble and oil-soluble emulsifiers of the water-in-oil type; 3. materials having solidification points in excess of $-10°$ C.; and, 4. dispersible in the adhesive mass with which they are used. Such materials lower the adhesion of adhesives in which they are incorporated in a selective manner by reducing the adhesion to materials of the hydrophylic type relatively much more than they reduce the adhesion to hydrophobic materials.

For practical purposes the following commercial products are most suitable as specific deactivators for tacky and pressure-sensitive adhesive masses: diethylene glycol oleate; diethylene glycol stearate; glycerol monostearate; pentaerythritol monostearate; phospholipids such as lecithin, cephalin, sphingomyelin, but preferably the commercial lecithin; polyethylene glycol (di, tri) ricinoleate; propylene glycol monostearate; sorbitan monostearate; and the stearyl amine salt of the stearyl amide of orthophosphoric acid having the formula:

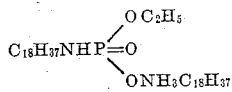

Compounds comprising long chain aliphatic groups having 9–20 carbon atoms and compounds comprising phosphorus and nitrogen in addition to carbon, hydrogen and oxygen are preferred.

Most, although, as has been shown, not all of the specific deactivators are esters of fatty acids. In accordance with Traube's rule [Traube, J. prak. Chem., N. F., 31, 177, 514 (1885); 34, 292, 515 (1886); Lieb. Ann., 265, 27 (1891); Rehbinder, Z. physik. Chem., 111, 447 (1924)] close homologs within each series behave in an expected manner with the heavier compound more active than the next lighter one. Thus, palmitates, margarates, nonadecanates and arachidates are active in a manner similar to that of stearates as are oleates, linoleates and linolenates.

The specific deactivators comprise normally from about one-eighth of a per cent to about five per cent by weight of the solids content of the adhesive mass, and preferably from about one-half to about three per cent by weight, although even addition of minute amounts of less than one-eighth per cent, gives some minor improvement. In the case of the stearyl amine salt of the stearyl amide of orthophosphoric acid the lower part of the normal range is preferred, namely one-eighth per cent to two per cent. The adhesive mass itself may be any of the normally tacky and pressure-sensitive adhesive masses that are so well known in the prior art although the invention is of greatest utility in the case of adhesive based on relatively non-polar elastomers such as natural rubber, polyisoprene and the vulcanizable elastomeric copolymers and interpolymers of at least 40 per cent butadiene and at least 10 per cent styrene. The adhesive mass may be especially compounded, copolymerized or interpolymerized to have the desired degree of adhesiveness in absence of additional tackifiers. Or, alternatively any of the conventional tackifiers may be used such as rosin, hydrogenated rosin, dehydrogenated rosin, the glycols and glycerides of any of these rosinous materials, polyterpenes, coumarone indene resins, polyalkyl styrenes, oil-soluble phenol aldehyde resins such as the ones disclosed in Drew Patent 2,410,053, patented October 29, 1946, or any other desired tackifier in any of the proportions that are so well known in the art. The adhesive mass may be free of an inert filler or may contain inert filler such as zinc oxide, magnesium carbonate, calcium carbonate, lead oxide, clay, titanium dioxide, aluminum, hydrated alumina, pulverized glass, silica or any of the other conventional filler for normally tacky and pressure-sensitive adhesives. Other ingredients such as antioxidants or heat stabilizers, dyes or pigments may be present or absent depending upon the particular desired use for the adhesive sheet. Typical normally tacky and pressure-sensitive adhesive masses are disclosed in Johnson and Johnson's British Patent No. 611,211, issued October 1948, in Nelson Patent 2,415,901, issued February 18, 1949, in Priepke Patent 2,405,926, issued August 13, 1946, in Buckley Patent 2,397,774, issued April 2, 1946, and in many other patents.

Many of the adhesive masses utilizing specific deactivators are of resinous character making unwinding of adhesive sheets rather noisy and somewhat uneven, characteristically jerky. In these cases inclusion of a stable oil in the adhesive mass composition improves unwinding characteristics and, as will be shown in the examples, has in some cases a synergistic effect on deactivation. Although any amount of oil has some effect on unwinding, amounts of from about ½ to about 10 per cent by weight of oil are preferred. The oils selected may be of any desired type as long as they are stable in the adhesive mass. Such widely different oils as soybean oil and mineral oil give excellent results.

The adhesive sheet may be a nonfibrous film backing or a fibrous woven or nonwoven backing or, alternatively, may be composed of laminations of such materials. Whether woven or nonwoven, fibrous or nonfibrous, the backings in connection with which specific deactivators are of greatest utility are: regenerated cellulose; cellulose esters such as cellulose acetate, cellulose acetate propionate, cellulose propionate, cellulose acetate butyrate, and cellulose butyrate; cellulose ethers such as methyl cellulose and ethyl cellulose; glass; polyvinyl alcohol; and, other strongly hydrophilic polar materials. The specific deactivators have little or no deactivating effects in the case of rubber hydrochloride, polyethylene, stainless steel and other non-polar hydrophobic materials, vinyl chloride acetate, phenol aldehyde resins, and, in some cases, even increase the adhesion to metal oxides, for instance of the type that is found on the surface of brass. The backing may be without a coating other than the normally tacky and pressure-sensitive adhesive mass or it may be precoated as mentioned earlier in this specification, for instance, in accordance with Morris Patent 2,424,996, issued August 5, 1947, Billings Patent 2,340,298, issued February 1, 1944, or Johnson and Johnson's British Patent 608,127, issued September 10, 1948.

To illustrate representative embodiments of the invention by way of example only and not to limit the scope of the invention in any way several examples of preferred embodiments are shown. The proportions in all of these examples are furnished as parts by weight of the adhesive composition.

EXAMPLE I

| Formulation: | Parts by weight |
|---|---|
| Natural rubber, e. g. pale crepe rubber. | 100.0 |
| Hydrogenated rosin glyceride (melting point 84° C.). | 25.0 |
| Polymer of unsaturated terpadiene (melting point 115° C.). | 25.0 |
| Antioxidant (e. g. diamyl hydroquinone). | 2.0 |
| Glyceryl monostearate | 1.52 (0.97 per cent of adhesive mass solvents). |

The above formulation was prepared by mixing solutions of the adhesive mass ingredients in aliphatic solvents e. g. of the normal heptane type or aromatic solvents of the toluene type and adding to the mixed solution glyceryl monostearate that was dispersed in toluene that had been heated to approximately 50 to 75° C. The solutions were adjusted so as to provide a concentrated solution having, depending upon the preferred coating material, 10 to 70 per cent solids in the indicated relative proportions. This adhesive mass was coated on regenerated cellulose film, for instance, of the type that had been primed in accordance with Billings Patent 2,340,298 mentioned above, to provide a coating weight of approximately one ounce of adhesive mass per square yard. In repeated experiments adhesive tape prepared as above was found to exhibit an adhesion to stainless steel that exceeded the adhesion to its own uncoated backing by seventy per cent. A control experiment made in the identical manner except for the omission of the specific deactivator, glyceryl monostearate, was found to adhere exactly to the same extent to stainless steel as to its own uncoated backing.

To exhibit the variation in deactivating effect, depending upon the type of backing that is used, the following comparison of percentage deactivation against various backings, comparing the above deactivator with the corresponding deactivator-free adhesive mass, is furnished:

| Backing | Percentage loss in adhesion |
|---|---|
| Cellophane | 41 |
| Cellulose acetate butyrate | 25 |
| Ethyl cellulose | 18 |
| Cellulose acetate | 13 |
| Glass | 12 |
| Rubber hydrochloride | 0 |
| Polyethylene | 0 |
| Stainless steel | 0 |
| Vinyl chloride acetate polymer | 0 |
| Curred phenol aldehyde resin | 0 |
| Oxides on the surface of brass | −31 (Actual increase in adhesion) |

While most of the above percentage deactivations were measured against film backings as such data are easiest to obtain quantitatively and reproducibly, it should be understood that similar effects can be observed qualitatively in the case of the corresponding fibrous backings.

Several other examples with widely varied specific deactivators, adhesive masses and backings are illustrated in the table that follows.

| | II | III | IV | V | VI | VII | VIII | IX | X | XI | XII | XIII | XIV | XV | XVI | XVII | XVIII |
|---|---|---|---|---|---|---|---|---|---|---|---|---|---|---|---|---|---|
| Diethylene Glycol Oleate | 1.5 | | | | | | | | | | | | | | | | |
| Diethylene Glycol Stearate | | 1.5 | | | | | | | | | | | | | | | |
| Glyceryl Monostearate | | | 1.5 | | | | | | | | | | | | | | |
| Lecithin from Animal Sources | | | | 3.3 | | | | | | | | | | | | | |
| Lecithin from Vegetable Sources | | | | | 1.8 | 1.8 | | | | | | | | | | | |
| Lecithin from Soya Beans modified with 40% Soya Oil | | | | | | | 5.5 | 13.3 | 5.9 | 2.8 | | | | | | | |
| Pentaerythritol Monostearate | | | | | | | | | | | 1.5 | | | | | | |
| Polyethylene Glycol (di, tri) Ricinoleate (Molecular Weight [1] Approximately 400) | | | | | | | | | | | | | 1.5 | | | | |
| Propylene Glycol Monostearate | | | | | | | | | | | | 1.9 | | | | | |
| Sorbitan Monostearate, Commercial Grade, Insoluble in Hot Mineral and Vegetable Oils | | | | | | | | | | | | | | 1.5 | | | |
| Sorbitan Monostearate, Commercial Grade, Soluble in Hot Mineral and Vegetable Oils | | | | | | | | | | | | | | | 1.5 | | |
| Stearyl Amine Salt of the Stearyl Amide of Ortho-Phosphoric Acid Formula: $C_{18}H_{37}NHP\begin{smallmatrix}OC_2H_5\\=O\\ONH_3C_{18}N_{37}\end{smallmatrix}$ | | | | | | | | | | | | | | | | 0.9 | 0.4 |
| Percent of Specific Deactivator Based on Total Solids in Mass | (1.0) | (1.0) | (1.4) | (1.0) | (1.8) | (1.8) | [2] (1.8) | [2] (4.4) | [2] (1.9) | [2] (1.0) | (1.0) | (1.4) | (1.7) | (1.0) | (1.0) | (0.5) | (0.5) |
| Butadiene-Styrene Copolymer Rubber (71 percent Butadiene, 29 percent Styrene, Mooney Viscosity 54) | | | | | | | | 100.0 | | 100 | | | | | | | |
| Polyacrylate Interpolymer comprising 50% Octyl Acrylate 30% Ethyl Acrylate and 20% Vinyl Acetate, Intrinsic Viscosity at 20° C. 1-2 | | | | | | | | | | | | | | | | 100.0 | 100.0 |
| Polyvinyl Ethyl Ether, Amorphous, Intrinsic Viscosity 2.37 | | | 100.0 | | | | | | | | | 100.0 | | | | | |
| Rubber, Natural | 100.0 | 100.0 | | 120.0 | 120.0 | 120.0 | 120.0 | 120.0 | | 100.0 | | | 120.0 | 100.0 | 100.0 | | |
| Methyl Rosinate, Hydrogenated | | | | | | | | | | | 15.2 | | | | | | |
| Alpha-Methyl Styrene Polymer, (Viscosity 700-1000 cps. at 60° F.) | | | | | | | | | | | | | | | | 40.0 | 40.0 |
| Polyterpene (Melting Point, 115° C.) | 25.0 | 25.0 | | 30.0 | 30.0 | 30.0 | 30.0 | 30.0 | | 25.0 | 25.0 | | 66.0 | 25.0 | 25.0 | | |
| Rosin Glyceride, Hydrogenated (Melting Point, 84° C.) | 25.0 | 25.0 | | 30.0 | 30.0 | 30.0 | 30.0 | 30.0 | 50.0 | 25.0 | 25.0 | | | 25.0 | 25.0 | | |
| Rosin, Hydrogenated | | | 5.0 | | | | | | | | | 5.0 | | | | | |
| Oil, Blend Aliphatic, Free of Aromatic Material | | | | 1.8 | | 1.8 | | | 1.8 | | | | | | | | |
| Soya Oil | | | | 2.2 | | | 2.2 | | | | | | | | | | |
| Calcium Carbonate, Finely Divided | | | | | | | | | | | | | | | | 25.0 | 25.0 |
| Zinc Oxide | | | | | | | | | 25.0 | | | | | | | | |
| Antioxidant (e. g. Diamyl Hydroquinone, Dibutyl Hydroquinone or Phenyl Alpha-Naphthylamine) | 2.0 | 2.0 | 0.4 | 2.5 | 2.5 | 2.5 | 2.5 | 2.5 | 2.0 | 2.0 | 2.0 | 0.4 | 2.5 | 2.0 | 2.0 | | |
| Principal Tests made on: Regenerated Cellulose Type Backing | yes | yes | | yes | yes | yes | yes | yes | yes | yes | | yes | yes | yes | yes | yes | yes |
| Cellulose Acetate Type Backing | | | yes | | | | | | | | yes | | | | | | |
| Adhesion to Backing in Tests lower than without Specific Deactivator by (average) percent | 18 | 18 | 35 | 35 | 23 | 35 | 42 | 35 | 76 | 13 | 48 | 42 | 67 | 58 | 62 | 40 | 34 |
| Adhesion to Stainless Steel type Surface lower than without Specific Deactivator by (average) percent | 0 | 13 | 11 | 13 | 7 | 13 | 13 | 0 | 15 | 25 | 33 | 6 | 30 | 7 | 20 | 0 | 0 |

[1] The molecular weight given is the molecular weight of the glycol from which the product is formed.
[2] These percentages are on the basis of the specific deactivator itself and exclude the oil modification.

The adhesive masses of the above examples are applied in any conventional manner, for instance in a manner similar to the method described in connection with Example I. The acrylate polymer and the butadiene-styrene copolymer are milled to the desired consistency before compounding with the remaining ingredients. The cellulose acetate film may be pre-coated with a primer or subbing coat comprising at least ten per cent butadiene-acrylonitrile copolymer (preferably not more than ninety per cent butadiene nor less than ten per cent acrylonitrile).

The adhesive masses may be applied to coating weights varying from one-half to five ounces per square yard. Coating weights of three-quarter to two ounces are preferred for nonfibrous backings, while coating weights of one and one-half to four ounces are preferred for fibrous backings, depending upon the nature and thickness of the specific backing, and upon the adhesive and elastic nature of the adhesive, and also upon the purpose of the adhesive sheet.

All data on adhesion reported herein were obtained in accordance with designation D903-46T of the American Society for Testing Materials as issued in 1946 and accepted by the Administrative Committee on Standards of that society on December 5, 1946.

Many other variations of the above described invention will be apparent to those skilled in the art and are included in the inventive concept.

The claims are:

1. An adhesive sheet comprising a backing having hydrophilic characteristics and a coating of a normally tacky and pressure-sensitive adhesive mass united to said backing; said adhesive mass including a major portion of at least one elastomeric base selected from the group consisting of: natural rubber; synthetic polyisoprene; the vulcanizable elastomeric polymers and interpolymers of from about 40 to about 90 per cent butadiene and from about 10 to about 60 per cent styrene; polyacrylate copolymers and interpolymers; and the lower vinyl ether polymers; and a minor proportion, not more than five per cent by weight, of one or more specific mass deactivators having the property of reducing the adhesion of said adhesive mass to materials having hydrophilic characteristics relatively much more than they reduce the adhesion of said adhesion mass to materials having hydrophobic characteristics, which deactivators are: 1. surface active; 2. water-insoluble and oil-soluble emulsifiers of the water-in-oil type; 3. materials having a solidification point in excess of −10° C.; 4. dispersible in said adhesive mass comprising phospholipid material.

2. An adhesive sheet comprising: a regenerated cellulose film backing and a coating of a normally tacky and pressure-sensitive adhesive mass based on natural rubber united to said backing, said adhesive mass including: a minor proportion, about one half to about three per cent by weight, of lecithin as specific mass deactivator; and about one-half to about ten per cent of stable oil as deresinifier for said adhesive mass.

3. An adhesive sheet comprising: a backing having hydrophilic characteristics and a coating of a normally tacky and pressure-sensitive adhesive mass united to said backing; said adhesive mass including: a major portion of at least one elastomeric base selected from the group consisting of: natural rubber; synthetic polyisoprene; the vulcanizable elastomeric polymers and interpolymers of from about 40 to about 90 per cent butadiene and from about 10 to about 60 per cent styrene; polyacrylate copolymers and interpolymers; and the lower vinyl ether polymers; and a minor proportion, about one-half to about three per cent by weight, of lecithin as specific mass deactivator; and about one-half to about 10 per cent of stable oil as deresinifier for said adhesive mass.

4. An adhesive sheet comprising: a backing having hydrophilic characteristics and a coating of a normally tacky and pressure-sensitive adhesive mass united to said backing; said adhesive mass including a major portion of at least one elastomeric base selected from the group consisting of: natural rubber; synthetic polyisoprene; the vulcanizable elastomeric polymers and interpolymers of from about 40 to about 90 per cent butadiene and from about 10 to about 60 per cent styrene; polyacrylate copolymers and interpolymers; and the lower vinyl ether polymers; and a minor proportion, about one-eighth to about five per cent by weight, of a phospholipid as specific deactivator for said adhesive mass.

5. An adhesive sheet comprising a backing having hydrophilic characteristics and a coating of a normally tacky and pressure-sensitive adhesive mass united to said backing; said adhesive mass including a major portion of at least one elastomeric base selected from the group consisting of: natural rubber; synthetic polyisoprene; the vulcanizable elastomeric polymers and interpolymers of from about 40 to about 90 per cent butadiene and from about 10 to about 60 per cent styrene; polyacrylate copolymers and interpolymers; and the lower vinyl ether polymers; and a minor proportion, not more than five per cent by weight, of one or more specific mass deactivators having the property of reducing the adhesion of said adhesive mass to materials having hydrophilic characteristics relatively much more than they reduce the adhesion of said adhesive mass to materials having hydrophobic characteristics, which deactivators are: 1. surface active; 2. water-insoluble and oil-soluble emulsifiers of the water-in-oil type; 3. materials having a solidification point in excess of −10° C.; 4. dispersible in said adhesive mass and which deactivators are selected from the group consisting of lecithin, cephalin, sphingomyelin.

JAMES A. McGARRY.

References Cited in the file of this patent

UNITED STATES PATENTS

| Number | Name | Date |
|---|---|---|
| 2,349,508 | Mack | May 23, 1944 |
| 2,365,020 | Stillwell | Dec. 12, 1944 |
| 2,395,419 | Mitchell | Feb. 26, 1946 |
| 2,439,481 | Martin | Apr. 13, 1948 |
| 2,462,029 | Perry | Feb. 15, 1949 |
| 2,463,452 | Yule | Mar. 1, 1949 |

FOREIGN PATENTS

| Number | Country | Date |
|---|---|---|
| 464,174 | Great Britain | Apr. 13, 1937 |